TRAINING CHAIR

Original Filed March 19, 1965

INVENTORS.
JAMES F. SELLARS, JR.
REYNOLD C. KING
BY
Trask, Jenkins & Hanley
ATTORNEYS.

TRAINING CHAIR

Original Filed March 19, 1965

INVENTORS.
JAMES F. SELLARS, JR.
BY REYNOLD C. KING
Trask, Jenkins & Hanley
ATTORNEYS.

TRAINING CHAIR

Original Filed March 19, 1965

INVENTORS.
JAMES F. SELLARS, JR.
REYNOLD C. KING
BY Trask, Jenkins & Hanley
ATTORNEYS.

TRAINING CHAIR

Original Filed March 19, 1965

INVENTORS.
JAMES F. SELLARS, JR.
REYNOLD C. KING
BY
Trask, Jenkins & Hanley
ATTORNEYS.

TRAINING CHAIR

Original Filed March 19, 1965

INVENTORS.
JAMES F. SELLARS, JR.
REYNOLD C. KING
BY
Trask, Jenkins & Hanley
ATTORNEYS.

TRAINING CHAIR

Original Filed March 19, 1965

INVENTORS.
JAMES F. SELLARS, JR.
REYNOLD C. KING
BY
Trask, Jenkins & Hanley
ATTORNEYS.

United States Patent Office

Re. 26,520
Reissued Jan. 21, 1969

26,520
TRAINING CHAIR

James F. Sellars, Jr., Corning, N.Y., and Reynold C. King, Jasper, Ind., assignors to Hamilton Cosco, Inc., Columbus, Ind., a corporation of Indiana Original No. 3,343,179, dated Sept. 26, 1967, Ser. No. 441,116, Mar. 19, 1965. Application for reissue Mar. 6, 1968, Ser. No. 711,144
U.S. Cl. 4—134 18 Claims
Int. Cl. A47k *13/06, 11/06*

Matter enclosed in heavy brackets [ ] appears in the original patent but forms no part of this reissue specification; matter printed in italics indicates the additions made by reissue.

ABSTRACT OF THE DISCLOSURE

An infant's training device having a seat portion and usable selectively on a conventional toilet seat and upon its own supporting base structure. Locating means are provided on said seat portion for removably mounting and fixedly locating the device in operative position on said toilet seat and base structure. A receiving vessel is usable with said device when it is used on said base structure, and means are provided on said seat portion for locating said vessel in alignment with an opening formed in said seat portion.

This invention relates to a device for toilet training infants, and more particularly to a chair for toilet training infants.

It is an object of the invention to provide an infant's training chair which can be removably mounted on a conventional toilet or which can employ its own supporting structure and receiving vessel and which, when used with its own supporting structure, permits the receiving vessel to be easily removed and remounted in operative position thereon. It is a further object of the invention to provide an infant's training chair of attractive appearance which can be economically manufactured largely from molded components, which will afford comfort and safety to an infant, and which will afford a high degree of sanitation.

In accordance with one form of the invention, there is provided a chair frame having a seat portion adapted to rest on a conventional toilet seat and provided with a centrally disposed opening having a downwardly extending flange around its periphery. A second flange projects downwardly from the seat portion radially outwardly from said opening for engagement with the inner edge of the toilet seat opening. A generally Z-shaped bracket is slidably mounted on the lower face of the seat portion adjacent the rear thereof for reception under the inner edge of the toilet seat opening whereby said bracket and second flange act in combination to releasably retain the chair in a fixed position on a toilet seat.

A pair of panels project upwardly from the seat portion along the rearward portions of its lateral edges. Desirably, a transversely extending rod is connected to said panels adjacent the upper ends thereof to limit rearward swinging movement of a lid pivotally connected to the upper face of the seat portion on a transverse axis rearward of the opening formed in said seat portion and to support said lid in its raised position. Conveniently, a safety strap is received in slots formed in the seat portion for holding an infant on the chair.

Other objects and features of the invention will become apparent from the more detailed description which follows and from the accompanying drawings in which.

Figure 1:
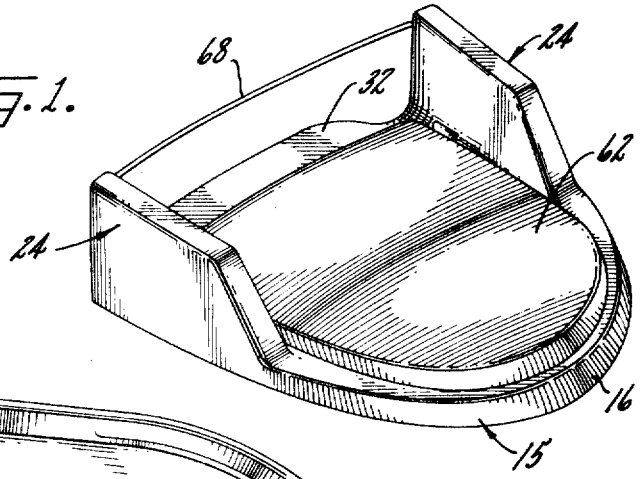
FIG. 1 is a perspective view of an infant's training chair embodying the invention.
Figure 2:
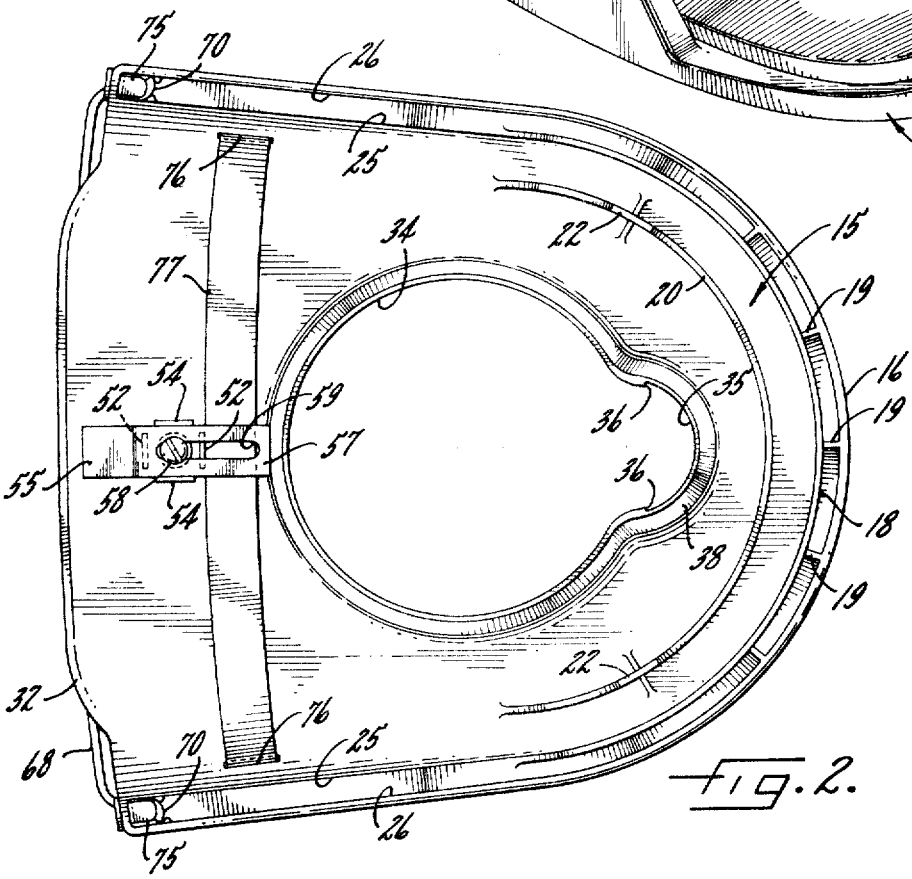
FIG. 2 is a bottom plan view thereof.
Figure 5:
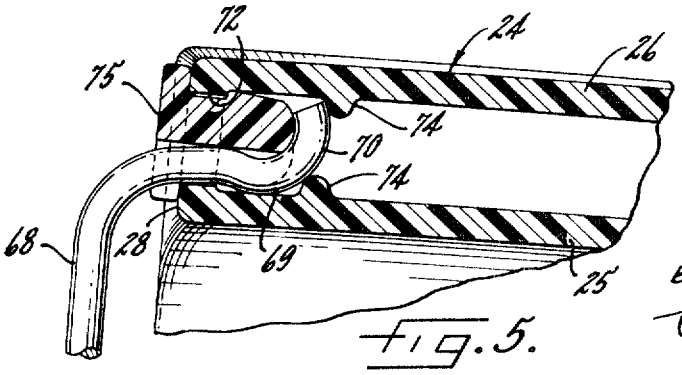
FIG. 5 is an enlarged horizontal section taken on the line 5—5 of FIG. 4.
Figure 3:
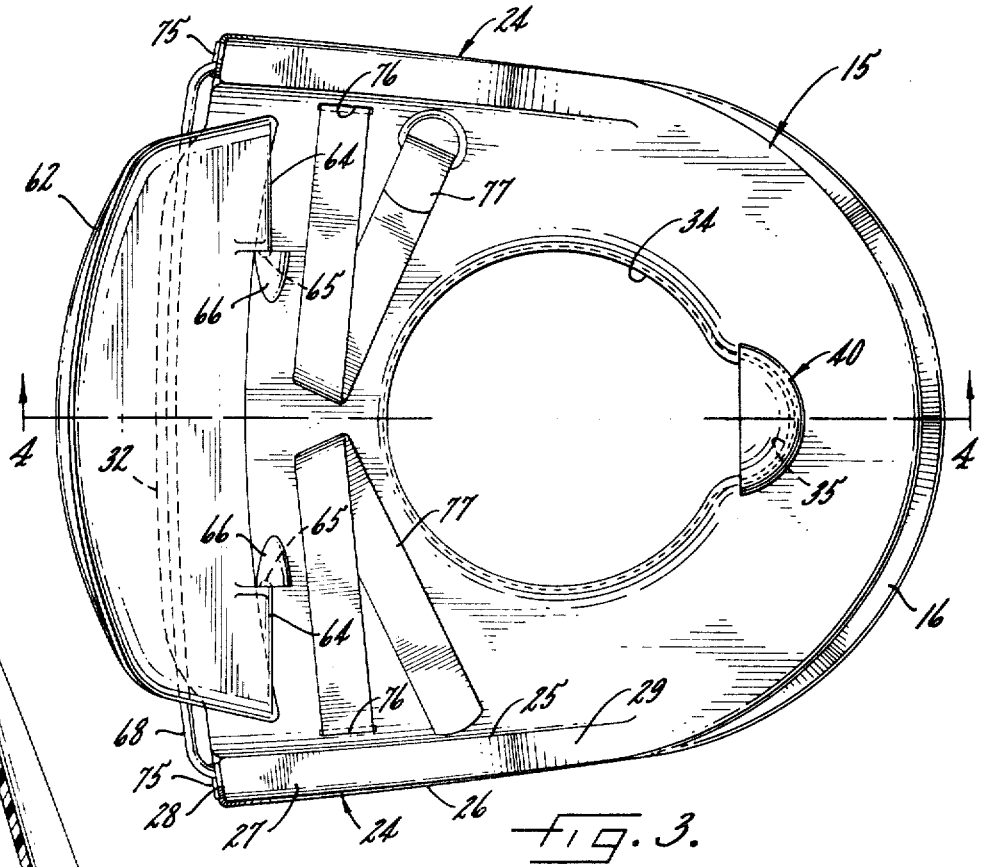
FIG. 3 is a plan view thereof, but showing the lid in raised position and a splash guard mounted thereon.

As shown, our infant's chair comprises a seat portion 15 conveniently formed as a plastic molding and having a downwardly projecting lip 16 extending across its arcuate front edge. An arcuate flange 18 concentric with the lip 16 projects downwardly from the seat portion immediately inwardly of the lip and is interconnected thereto by a plurality of arcuately spaced braces 19. A second flange 20 concentric with the flange 18 and having an arcuate extent substantially the same as the flange 18 projects downwardly from the seat portion 15 inwardly of the flange 18. The flange 20 projects downwardly below the extent of the flange 18 and is provided with a pair of downwardly projecting ears 22 arcuately spaced on the flange 20 on opposite sides of the longitudinal center of the seat portion.

Figure 4:
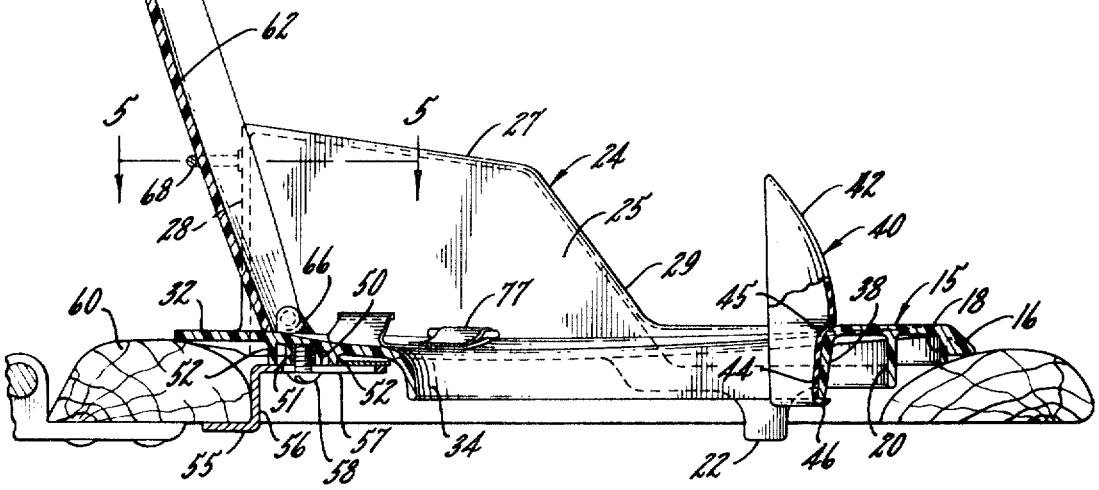
FIG. 4 is a longitudinal section taken on the line 4—4 of FIG. 3 and showing the chair mounted on a conventional toilet seat.
Figure 7:
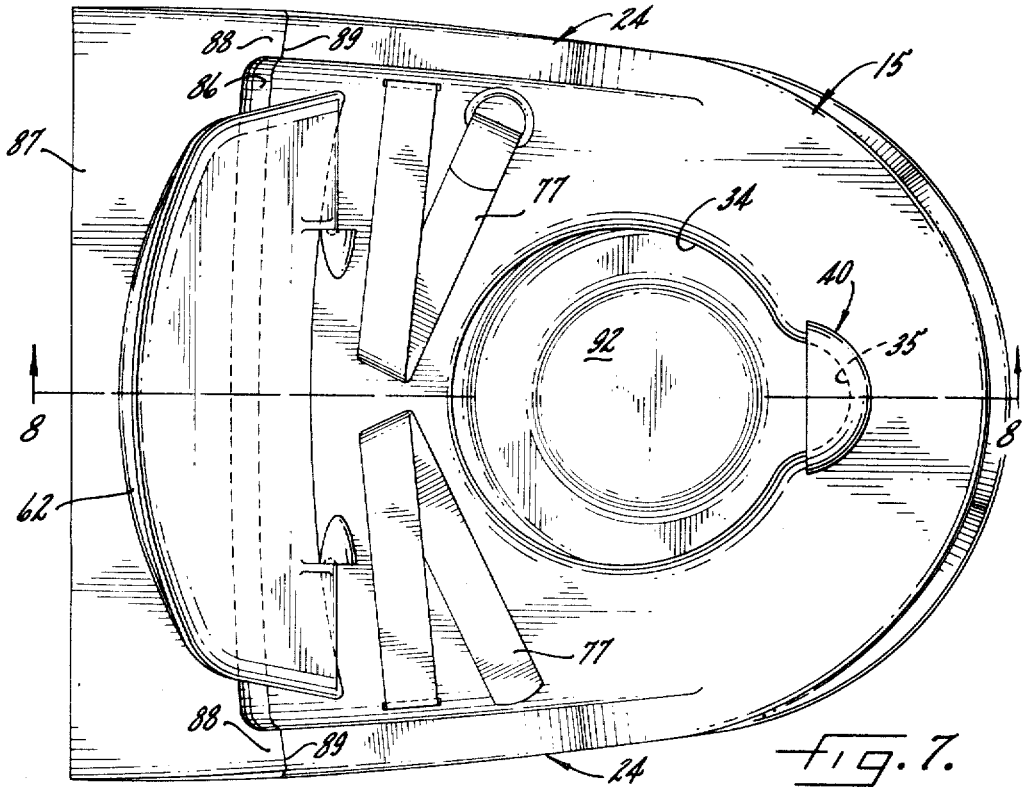
FIG. 7 is a plan view of the infant's chair shown in FIG. 6.
Figure 6:
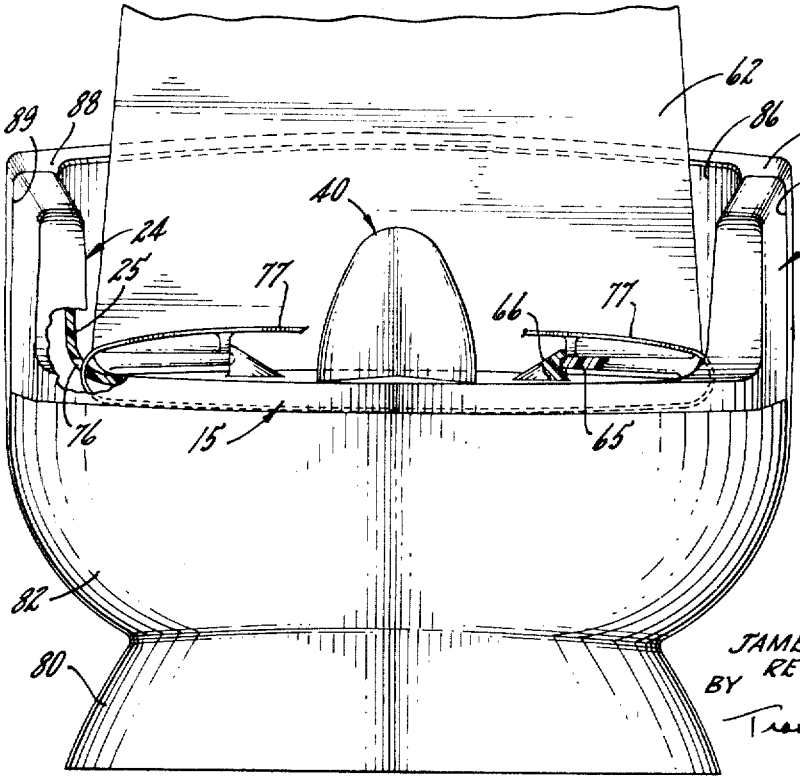
FIG. 6 is a front elevation of the infant's chair shown in FIG. 1, but showing said chair mounted on its own supporting structure, and with portions thereof being broken away.

A pair of side panels or projections 24 project upwardly from the lateral edges of the seat portion adjacent the rear end thereof to provide a pair of confining side members to help hold an infant on a chair. Each of said panels comprises an inner wall 25 connected to an outer wall 26 by a top wall 27, rear wall 28, and forward wall 29. The rear walls 28 are generally vertically oriented, and the front walls 29 slope forwardly with their forward lower ends blending into the upper face of the seat portion 15. As shown in FIG. 4, the panel rear walls 28 terminate forwardly of a generally planar tongue 32 projecting outwardly from the rear edge of the seat portion 15.

An enlarged opening 34 is formed in the seat portion adjacent the center thereof. At its forward end, said opening is provided with a forwardly projecting arcuate extension 35 having a pair of laterally spaced inwardly directed shoulders 36 adjacent its connection to the main portion of the opening 34. The edges of the opening 34 are defined by a downwardly projecting flange 38 extending around the periphery of said opening and its extension. Desirably, the flange 38 has a depth greater than the flange 20 but less than the ears 22. A cup-shaped rearwardly open splash guard 40 is adapted to be carried in the extension 35. As shown, said splash guard comprises an arcuate upper portion 42 projecting above the seat portion and connected to an arcuate lower portion 44 by an offset shoulder 45 adapted to seat against the flange 38 at its interconnection to the upper face of the seat portion 15. The lower end of the guard portion 44 terminates in an upwardly open hook 46 receivable under the lower edge of the flange 38. The guard portion 44 has a radius of curvature slightly larger than the radius of curvature of the extension 35 whereby the splash guard can be press-fit in the extension 35 with its hook 46 received under the flange 38 and its rear edges abutting the shoulders 36 for thus releasably bindingly retaining said splash guard in a rearwardly open operative position.

Rearwardly of the opening 34, the seat portion 15 has an apertured boss 50 projecting downwardly from its lower face and fitted with a threaded insert 51. A pair of transversely extending guide ribs 52 are disposed forwardly and rearwardly of the boss 50 with their lower ends coplanar with the lower end of said boss. A pair of forwardly and rearwardly extending guide ribs 54 are disposed on opposite lateral sides of the boss 50 and have their lower ends projecting downwardly below the bottom of said boss. A Z-shaped bracket comprising a rearwardly directed leg 55 interconnected by a vertical web 56 to a forwardly directed leg 57 is connected to the boss 50 by a screw 58 extending upwardly through an elongated slot 59 formed in the leg 57 for reception in the insert 51. In mounting the chair on a conventional toilet seat 60, the flange 18 rests on the upper face of the seat and the flange ears 22 are received against the edge of the seat opening. The rearward portion of the chair is supported by the tongue 32 resting on the seat 60. The bracket leg 55 is received under the seat and acts in combination with the ears 22 for releasably retaining the chair in a fixed position on said seat. By sliding the leg slot 59 fore and aft on the screw 58, the fore and aft positioning of the leg 55 can be adjusted for mounting the chair on different size seats. These longitudinal sliding movements of the slot 59 on the screw 58 are guided by the ribs 54 engaging the lateral edges of the bracket leg 57.

Desirably, the chair is provided with a lid 62 conveniently formed as a plastic molding. Said lid has a cross-sectional extent greater than the cross-sectional extent of the opening 34 and its extension 35 and a width less than the spacing between the inner walls 25 of the panels 24. A pair of rearwardly projecting extensions 64 are formed on the rear edge of the lid 62, and each of said projections is provided with an inwardly extending pin 65 rotatably carried in an upwardly projecting ear 66 formed on the upper face of the seat portion 15 to define a transverse pivot axis for swinging movement of the lid from a closed position overlying the opening 34 to a raised position to which it projects rearwardly and upwardly from the chair. It is to be understood, of course, that the splash guard must be removed before the lid can be moved into its closed position.

In order to limit the rearward swinging movement of the lid and to support it in its raised position, a transversely extending rod 68 extends across the rear of the chair. As shown, the ends of said rod are bent forwardly as at 69 and then outwardly as at 70. The rod ends are received in openings 72 formed in the side panel rear walls 28. Immediately below the plane of the openings 72, the inner faces of the inner and outer panel walls 25 and 26 are provided with inwardly projecting abutments 74 which act in combination with the opening 72 for supporting the rod in a rearwardly projecting operative position on the chair. The rod is further retained in position by plugs 75 carried in the openings 72 between the rod and stretches 69 and the panel outer walls 26. With the rod 68 being disposed rearwardly of the lid axis formed by the pins 65 and ears 66, the lid can be swung over center to its raised position, and the rod 68 will support it in said raised position.

Conveniently, a pair of slots 76 are formed in the seat portion 15 within the fore and aft extent of the side panels 24. A safety belt 77 is carried in the slots 76 with its free ends projecting upwardly through said slots for fastening around an infant sitting on the chair.

The training chair show in FIGS. 1–5 can also be mounted on its own supporting base and provided with its own receiving vessel so that it need not be employed with a conventional toilet. The supporting structure shown in the embodiment illustrated in FIGS. 6–9 comprises a ground-engaging base 80 connected at its upper end to a bowl 82 having an inwardly directed lip 83 extending around its forward end and the forward portions of its lateral sides. Said bowl has an open rearward end and is provided with a floor 84 having an enlarged opening 85 formed therein. An upwardly projecting rear wall is formed on the bowl 82 and comprises a transversely extending front panel 86 terminating at its upper end in a rearwardly extending top wall 87. The panel 86 and wall 87 extend transversely of the bowl and at their lateral ends terminate in forwardly projecting panels 88 provided with front walls 89. The panels 88 have a width corresponding to the width of the chair side panels 24, and the bowl panel front walls 89 are angled slightly forwardly so that the side panels 88 and 24 can be brought into aligned abuttting relationship. It is to be understood, of course, that in using the chair shown in FIG. 4 with this supporting base, the lid rod 68 will be removed from the chair. The lid 62 will still swing rearwardly about the axis of the pins 65 and ears 66, but will be supported in its raised position by the rear wall panel 86.

The chair illustrated in FIG. 4 can be mounted on the bowl 82 by inserting the chair tongue 32 into a transversely extending, forwardly open channel 90 in the rear wall panel 86. The channel supports the rear portion of the chair on the bowl with the chair side panels 24 abutting, and being continuous with, the bowl side panels 88. The forward portions of the chair are supported on the bowl by the chair lip 16 resting on the bowl lip 83. The flange 18 engages the inner edge of the bowl lip 83 for locating the forward portion of said chair on the bowl and then retaining the tongue 32 in the channel 90.

Figure 8:
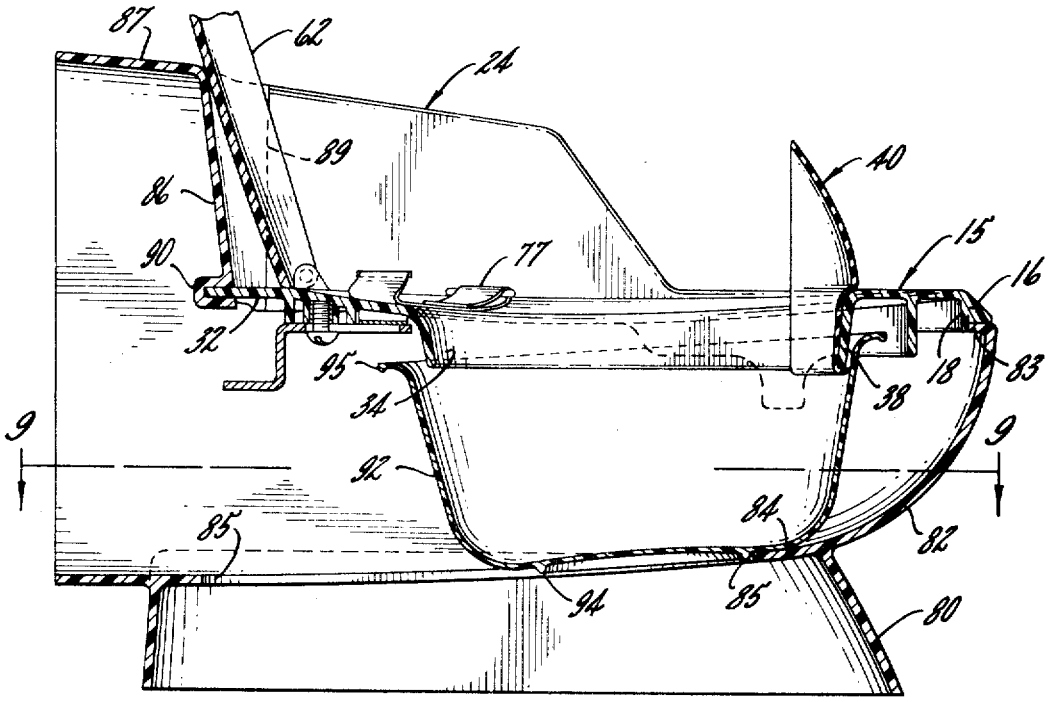
FIG. 8 is a vertical section taken on the line 8—8 of FIG. 7.
Figure 9:
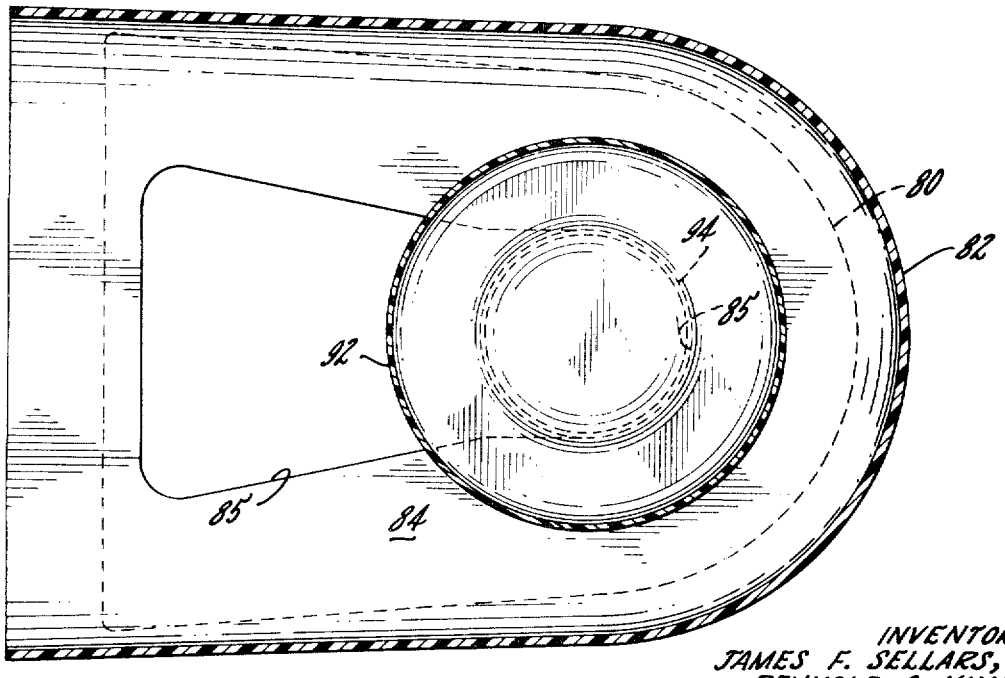
FIG. 9 is a horizontal section taken on the line 9—9 of FIG. 8.
Figure 11:
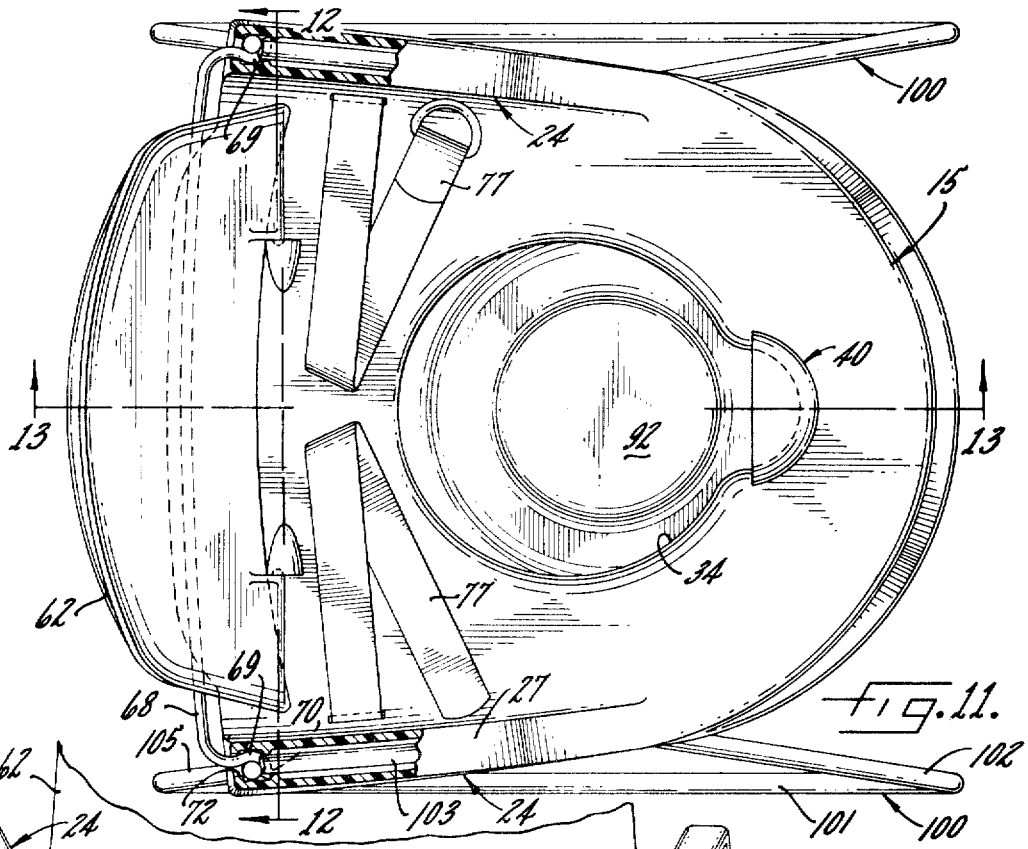
FIG. 11 is a plan view of the chair shown in FIG. 10 and showing portions thereof broken away.
Figure 10:
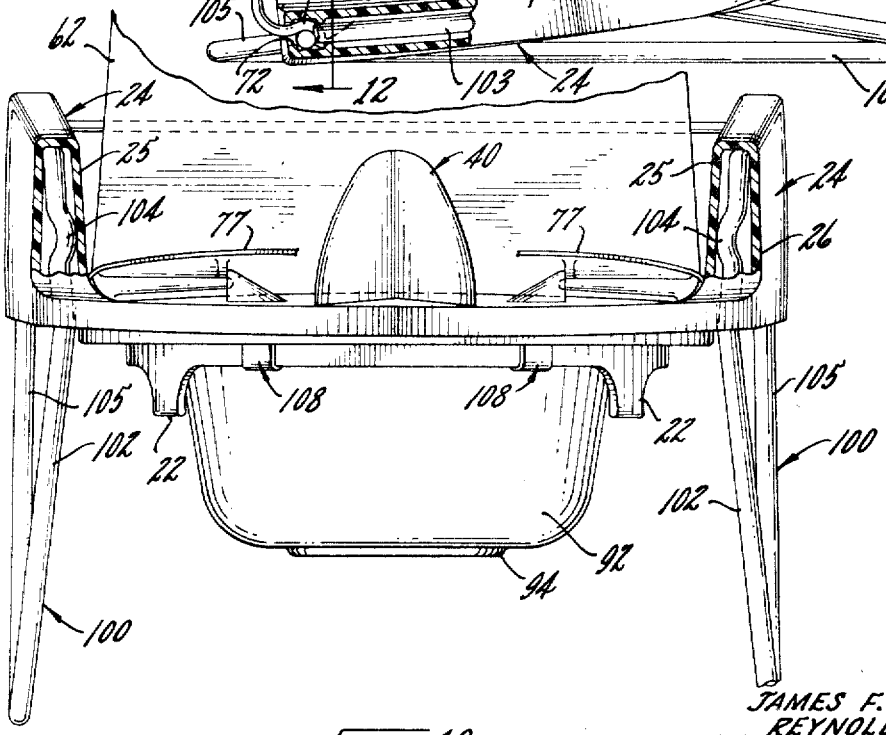
FIG. 10 is a front elevation of the infant's chair shown in FIG. 1, but showing said chair on a modified form of the supporting structure and with portions thereof being broken away.
Figure 12:
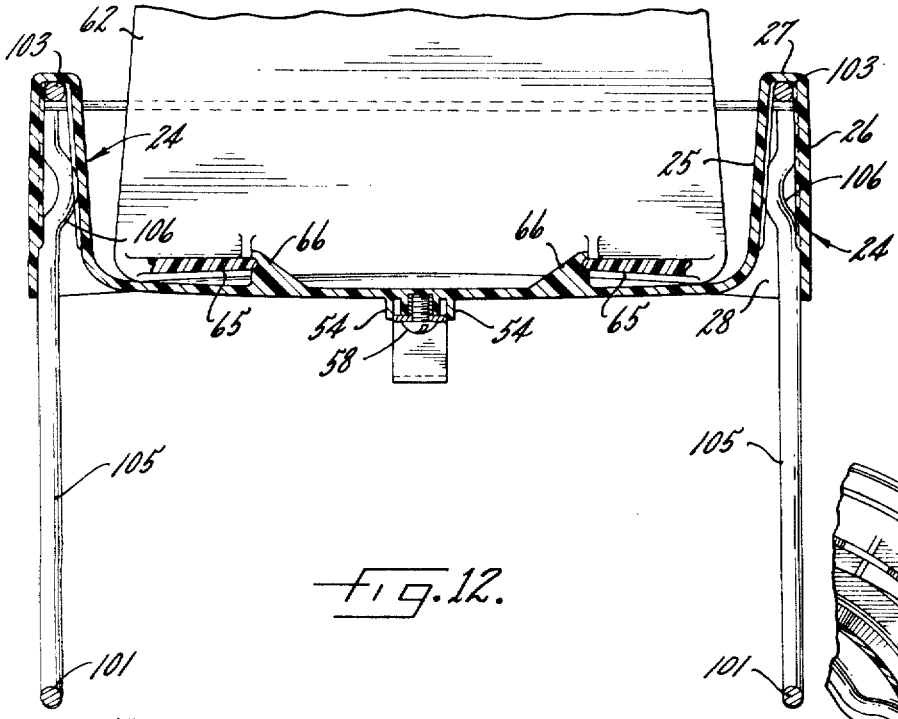
FIG. 12 is a vertical section taken on the line 12—12 of FIG. 11.
Figure 13:
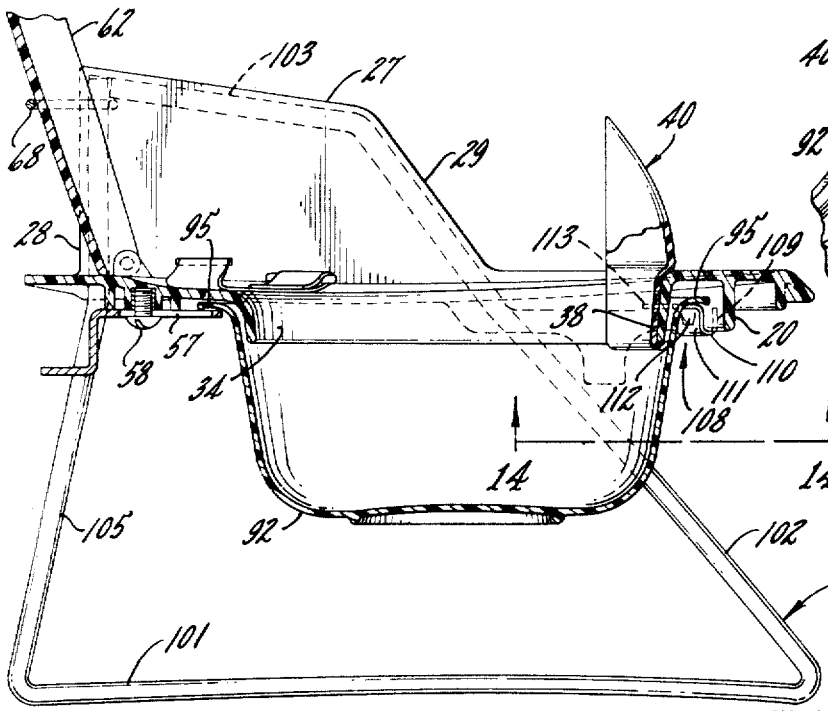
FIG. 13 is a vertical section taken on the line 13—13 of FIG. 11.
Figure 14:
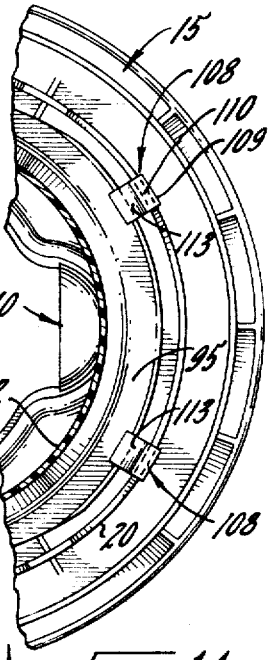
FIG. 14 is a horizontal section taken on the line 14—14 of FIG. 13.

A receiving vessel 92 is supported on the bowl floor 84 in vertical alignment with the opening 34 and its extension 35. As shown in FIG. 8, the bottom of the vessel 92 is provided with an annular rib 94 adapted to abut the forward edge of the opening 85 in the floor 84. The upper end of the vessel has a diameter slightly larger than the fore and aft extent of the opening 34 and its extension 35 so that the flange 38 will project downwardly into the open upper end of the vessel 92. Thus, the flange 38 and the floor opening 85 act in combination to locate the vessel 92 in vertical alignment with the chair opening 34 and its extension 35. Conveniently, an outwardly projecting rim 95 is formed on the upper end of the vessel 92.

Still another modified form of the supporting structure for the chair is illustrated in FIGS. 10–14. In this embodiment, the chair is supported on a pair of laterally spaced leg frames 100. Each of said leg frames is identical in construction and comprises a ground-engaging stretch 101 continuous at its forward end with a rearwardly angled front leg 102 projecting upwardly between the inner and outer walls 25 and 26 of the adjacent chair side panel 24. The leg 102 is at the same general rearward inclination as the side panel front wall 29 to abut the inner face of said wall, and its upper end is angled further rearwardly to provide an upper horizontal stretch 103 adapted to abut the lower face of the side panel by wall 27. An offset 104 is formed on the leg 102 within the extent of the side panel 24 to abut the inner faces of the panel walls 25 and 26 to bindingly retain said leg within the side panel. The rear end of the ground engaging leg stretch 101 is continuous with an upwardly and forwardly directed rear leg 105 which projects upwardly into the side panel 24 against the forward face of the rear wall 28. Within the vertical extent of the side panel, the rear leg 105 is also provided with an offset 106 bindingly received between the inner faces of the panel walls 25 and 26.

In this embodiment, as contrasted to the embodiment shown in FIGS. 6–9, the lid retaining rod 68 is employed for limiting the rearward swinging movement of the lid 62 about the axis of the pins 65 and ears 66. As described in connection with FIGS. 1–5, the ends 69 and 70 of said rod are received in the openings 72 in the rear walls 28. The assembly of the rod on the chair differs slightly with this supporting structure than the assembly of the rod on the chair seat when the supporting structure is not employed as shown in FIGS. 1–5. With this supporting structure, the plugs 75 are not employed and the out-turned rod ends 70 are received around the upper ends of the rear legs 105 so that the rod ends are interposed between the leg 105 and the abutments 74 and the upper ends of the leg 105 are confined between the rod ends 70 and the rear wall 28.

The vessel 92 is supported in operative position below the opening 34 with the forward portion of its rim 95 resting on a pair of brackets 108 mounted on the flange 20 in arcuately spaced relationship. Each of the brackets comprises a front leg 109 interconnected by a web 110 to a rear leg 111. Inwardly and downwardly struck tongues 112 are formed on the bracket legs 111 to pierce the inner face of the flange 20 for bindingly retaining said brackets thereon. The upper end of each of the rear legs 111 terminates in an inwardly projecting finger 113 extending inwardly under the vessel rim 95 for supporting the forward portion of the vessel. The rear portion of the vessel rim 95 is supported on the forwardly extending leg 57 of the bracket mounted on the seat portion by the screw 58. Thus, the vessel is supported on the brackets 108 and the bracket leg 57, in operative position immediately below the opening 34 with the flange 38 projecting downwardly into said vessel. To remove the vessel from the chair, it is merely necessary to slide the bracket leg 57 rearwardly with its slot 59 riding on the screw 58 and the ribs 54 guiding said sliding movement. When the leg 57 has cleared the rear edge of the rim 95, the front portion of the vessel can be slid off of the bracket fingers 113 and said vessel can be removed from under the chair. Conversely, to mount the vessel in operative position, it is merely necessary to dispose the forward portion of the rim 95 on the bracket fingers 113 and then slide the bracket leg 57 forwardly to rest under the rear portion of said rim.

We claim:

1. An infant's training device for use in combination alternatively with a conventional toilet seat or a supporting base structure *and formed as a unitary molding*, comprising a seat portion provided with a centrally disposed opening, means forming a pair of upwardly directed projections disposed in rigidly fixed position with respect to said seat portion along the lateral edges of said seat portion and extending toward the rear thereof, means on said device for locating it in an operative position on said toilet seat or base structure, a lid having a lateral extent less than the spacing between said projections swingably mounted on said seat portion for movement between a closed position overlying said opening and a raised position projecting upwardly from said seat portion, [and] a tranversely extending rod removably mounted in *openings formed in* said means forming said upwardly directed projections adjacent the upper ends thereof for supporting said lid in its raised position when said device is used on said toilet seat *and retaining means receivable in said openings in said means for removably mounting said rod therein.*

2. An infant's training device, comprising a seat portion provided with a centrally disposed opening, said opening having an arcuate extension at its forward end provided with a pair of arcuately spaced shoulders, flange means projecting downwardly from said seat portion along the periphery of said opening and extension, a rearwardly open cup-shaped splash guard removably carried in said extension having an upper portion projecting above said seat portion and lower portion carried against said flange means with its edges abutting said shoulders, said upper and lower portions having an offset at their juncture supported against the upper portion of said flange means, said lower portion having a radius of curvature slightly larger than the radius of curvature of said arcuate extension and a hook received under said flange means and means for supporting said seat portion in an operative position.

3. An infant's training device, comprising a seat portion provided with a centrally disposed opening *having an arcuate extension at its forward end provided with a pair of arcuately spaced shoulders,* a first flange projecting downwardly from said seat portion along the periphery of said opening *and extension,* a second flange projecting downwardly from and extending peripherally of the front part of said seat portion, a third flange projecting downwardly from said seat portion and interposed between said first and second flanges, means forming a pair of upwardly directed projections disposed along the lateral edges of said seat portion adjacent the rear thereof, a generally Z-shaped bracket slidably mounted on the lower face of said *seat* portion rearwardly of said opening, said bracket having a rearwardly projecting leg interconnected by a vertical web to a forwardly projecting leg slidably connected to said seat portion, *a rearwardly open cup-shaped splash guard carried in said extension having an upper portion projecting above said seat portion and a lower arcuate portion carried against said first flange with its lateral edges abutting said shoulders, said upper and lower portions being offset at their juncture with said offset juncture being supported against the upper portion of said first flange, said lower portion having a radius of curvature slightly larger than the radius of curvature of said arcuate extension, a hook on said lower portion received under said first flange,* and means for supporting said seat portion in an operative position.

[4. An infant's training device as set forth in claim 3 with the addition that a boss is formed on said seat portion and a screw projects through a slot formed in said forwardly projecting bracket leg and is threadedly received in said boss, whereby said bracket is adjustably movable on said seat portion.]

[5. An infant's training device as set forth in claim 4 with the addition that a first pair of guide ears are provided on said seat portion forwardly and rearwardly of said boss with their lower ends substantially coplanar with the lower end of said boss, and a second pair of guide ears are provided on said seat portion laterally of said boss with their lower ends projecting below said boss for guiding the sliding movements of the bracket in a fore and aft direction.]

6. An infant's training device as set forth in claim 3 in which at least portions of said third flange project below said second flange whereby said device can be supported on a conventional toilet seat with said portions of said third flange engaging the opening in said seat and said rearwardly projecting bracket leg being received under said seat.

7. An infant's training device as set forth in claim 6 with the addition that a lid is swingably mounted on said seat portion rearwardly of the opening therein, and a transversely extending rod is mounted on the projections adjacent the upper ends thereof for supporting said lid in an open position.

8. An infant's training chair, comprising a seat portion provided with a centrally disposed opening, a first flange projecting downwardly from said seat portion along the periphery of said opening, a second flange projecting downwardly from and extending peripherally of the front part of said seat portion, a third flange projecting downwardly from said seat portion between said first and second flanges, means forming a pair of upwardly directed projections disposed along the lateral edges of said seat portion adjacent the rear thereof, said seat portion being supported on a rearwardly open bowl carried on a ground engageable base, said bowl having a floor having an opening formed therein, and a receiving vessel having a diameter greater than the width of said floor opening whereby said vessel can be supported on said floor in the opening therein with its upper end disposed between said first and third flanges.

9. An infant's training chair as set forth in claim 8 in which said bowl has an upwardly extending back panel provided with a transversely extending channel and said seat portion is supported on the rim of the bowl with its rear edge received in said channel and said second flange is disposed along the edge of the bowl rim.

10. An infant's training chair as set forth in claim 9 with the addition that the back panel on said bowl is connected to a pair of side panels having front walls abutting the rear walls of said projections on the seat portion.

11. An infant's training chair, comprising a seat portion provided with a centrally disposed opening, a first flange projecting downwardly from said seat portion along the periphery of said opening, a second flange projecting downwardly from said seat portion slightly inwardly from the forward edge thereof, a third flange projecting downwardly from said seat portion between said first and second flanges, means forming a pair of upwardly directed projections disposed along the lateral edges of said seat portion adjacent the rear thereof, a generally Z-shaped bracket slidably mounted on the lower face of said seat portion rearwardly of said opening, said bracket having a rearwardly projecting leg interconnected by a vertical web to a forwardly projecting leg slidably connected to said seat portion, said seat portion being supported on a pair of leg frames operatively connected to said projections, and a receiving vessel supported on said bracket and bracket means on said third flange in alignment with said opening.

12. An infant's training chair as set forth in claim 11 in which each of said leg frames comprises a ground engageable stretch connected to front and rear legs bindingly carried in one of said projections.

13. An infant's training chair as set forth in claim 12 with the addition that a lid is swingably mounted on the seat portion rearwardly of the opening therein, and a transversely extending rod is mounted in said projections for supporting said lid in a raised position, the ends of said rod being received around the upper portions of said rear legs within said projections.

14. An infant's training chair as set forth in claim 11 in which said bracket means comprise a pair of U-shaped brackets mounted on said third flange inarcuately spaced relation and each having an inwardly projecting leg, and said receiving vessel has an outwardly projecting rim supported on the inwardly projecting legs on said U-shaped brackets and the forwardly projecting leg on the Z-shaped bracket.

15. An infant's training [device] *chair* [for use], *said chair comprising a seat portion in combination with a base structure, said seat portion being usable* in combination alternatively with a conventional toilet seat or [a] *said* supporting base structure, said [device] *seat portion* being adapted to rest on and be supported by the conventional toilet seat or the base structure and [comprising a seat member] provided with a central opening, first means on said seat [member] *portion* for locating it against horizontal displacement relative to the base structure when the [device] *seat portion* is supported thereon, and second means on said seat [member] *portion* for locating it on the conventional toilet seat when the [device] *seat portion* is supported thereon, said first means having near the periphery of the seat [member] *portion* vertical surfaces for engagement with the base structure, said second means comprising locating elements positioned in front and in rear of said central opening and inwardly from the periphery of the seat [member] *portion* and projecting downwardly below the seat [member] *portion* for entry into the opening of the conventional toilet seat, one of said locating elements being adjustable horizontally toward and away from the other and including a horizontal end portion adapted to engage the lower surface of the conventional toilet seat, *said supporting base structure comprising a rearwardly open bowl portion supported on a base, said bowl portion having an open upper end for supporting said seat portion thereon with said first means on said seat member engaging said bowl portion, a floor fixedly mounted in said base structure at the juncture of said bowl portion and base, and a receivng vessel removably seated on said floor in alignment with the opening in said seat member.*

16. An infant's training device [as set forth in claim 15 in which] *for use in combination alternatively with a conventional toilet seat or a supporting base structure, said device being adapted to rest on and be supported by the conventional toilet seat or the base structure and comprising a seat member provided with a central opening, first means on said seat member for locating it against horizontal displacement relative to the base structure when the device is supported thereon, and second means on said seat member for locating it on the conventional toilet seat when the device is supported thereon, said first means having near the periphery of the seat member vertical surfaces for engagement with the base structure, said second means comprising locating elements positioned in front and in rear of said central opening and inwardly from the periphery of the seat member and projecting downwardly below the seat member for entry into the opening of the conventional toilet seat, one of said locating elements being adjustable horizontally toward and away from the other and including a horizontal end portion adapted to engage the lower surface of the conventional toilet seat,* said seat member [is] *being* provided at its periphery with at least one upwardly presented surface adapted to engage beneath a downwardly presented surface on the base structure to retain the seat member thereon.

17. An infant's training device [as set forth in claim 15 in which] *for use in combination alternatively with a conventional toilet seat or a supporting base structure, said device being adapted to rest on and be supported by the conventional toilet seat or the base structure and comprising a seat member provided with a central opening, first means on said seat member for locating it against horizontal displacement relative to the base structure when the device is supported thereon, and second means on said seat member for locating it on the conventional toilet seat when the device is supported thereon, said first means having near the periphery of the seat member vertical surfaces for engagement with the base structure, said second means comprising locating elements positioned in front and in rear of said central opening and inwardly from the periphery of the seat member and projecting downwardly below the seat member for entry into the opening of the conventional toilet seat, one of said locating elements being adjustable horizontally toward and away from the other and including a horizontal end portion adapted to engage the lower surface of the conventional toilet seat,* said seat member [is] *being* provided with an opening adapted to receive a retaining element on the base structure.

18. An infant's training [device] *chair* [for use], *said chair comprising a seat portion in combination with a base structure, said seat portion being usable* in combination alternatively with a conventional toilet seat or a supporting base structure, [comprising a seat portion] *said seat portion being* provided with a centrally disposed opening, means forming a pair of upwardly directed projections disposed in rigidly fixed position with respect to said seat portion along the lateral edges thereof, locating means projecting downwardly from said seat portion on one side of said opening engageable with the edges of the opening in said toilet seat at one side thereof, means adjustably mounted on the bottom of said seat portion on the opposite side of the opening therein for engagement with the edge of said opening in the toilet seat at the opposite side thereof, said last mentioned means being releasably lockable in longitudinally spaced positions of adustment with respect to said locating means for fixedly locating the [device] *seat portion* on said toilet seat, [and] means at the periphery of said [device] *seat portion* interlockingly engageable with said base structure for removably mounting it in a fixed position thereon, *said base structure being open at its rear and having an open upper end for supporting said seat portion thereon with said means at the periphery of said seat portion engaging the upper portions of said base structure, a floor fixedly mounted in said base structure intermediate its height, and a receiving vessel removably seated on said floor in alignment with the opening in said seat portion.*

19. An infant's training chair, comprising a seat portion provided with a centrally disposed opening, flange means projecting downwardly from said seat portion around said opening, means forming a pair of upwardly directed projections disposed in rigidly fixed position with respect to said seat portion along the lateral edges of said seat portion and extending toward the rear thereof, a rearwardly open ground engageable base structure, means for removably mounting said seat portion on said base structure, a floor in said base structure, a receiving vessel removably supported on said floor, and means for locating said receiving vessel on said floor in alignment with said opening.

20. An infant's training chair as set forth in claim 19 in which said means for locating said receiving vessel comprises an opening formed in said floor for the reception of the lower portion of said vessel.

References Cited

The following references, cited by the Examiner, are of record in the patented file of this patent or the original patent.

UNITED STATES PATENTS

| | | | |
|---|---|---|---|
| 1,174,870 | 3/1916 | Johnson et al. | 4—239 |
| 1,739,366 | 12/1929 | Lang. | |
| 1,951,621 | 3/1934 | Mayette | 4—239 |
| 2,535,704 | 12/1950 | Snyder et al. | |
| 2,682,914 | 7/1954 | Wing | 4—239 XR |
| 2,687,535 | 8/1954 | Almorth | 4—239 |
| 2,804,121 | 8/1957 | Singleton | 4—134 XR |
| 2,880,786 | 4/1959 | Black | 4—239 XR |
| 2,955,296 | 10/1960 | Zapolski | 4—239 |
| 3,061,262 | 10/1962 | Nika | 4—134 XR |
| 3,371,356 | 3/1968 | Benjamin | 4—239 |
| 1,701,115 | 2/1929 | McKinney | 297—250 X |
| 2,050,114 | 8/1936 | Moore. | |
| 2,255,272 | 9/1941 | Rasmussen | 4—239 |
| 3,172,390 | 3/1965 | Gartho Fner | 4—134 X |

FOREIGN PATENTS

| | | |
|---|---|---|
| 124,022 | 5/1947 | Australia. |
| 530,285 | 9/1956 | Canada. |

LAVERNE D. GEIGER, *Primary Examiner.*

J. S. MEDNICK, *Assistant Examiner.*